United States Patent
Zastrow et al.

(10) Patent No.: US 9,099,241 B1
(45) Date of Patent: Aug. 4, 2015

(54) ENHANCED CHARGE-STORAGE ELECTROCHEMICAL DOUBLE LAYER CAPACITORS WITH NANOSCALE ELECTROLYTE CONFINEMENT TUNABILITY, AND A METHOD FOR PRODUCTION THEREOF TO OBTAIN AXI-SYMMETRIC, HIGH SURFACE AREA ELECTRODE GROWTH

(71) Applicant: Mainstream Engineering Corporation, Rockledge, FL (US)

(72) Inventors: Dustin Zastrow, Indialantic, FL (US); Katherine Nicol, Rockledge, FL (US); Justin J. Hill, Merritt Island, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 124 days.

(21) Appl. No.: 13/860,005

(22) Filed: Apr. 10, 2013

(51) Int. Cl.
| | |
|---|---|
| H01G 9/00 | (2006.01) |
| H01G 11/24 | (2013.01) |
| H01G 11/36 | (2013.01) |
| H01G 9/042 | (2006.01) |
| H01G 9/15 | (2006.01) |
| H01M 4/583 | (2010.01) |
| B82Y 30/00 | (2011.01) |

(52) U.S. Cl.
CPC .......... *H01G 9/0036* (2013.01); *H01G 9/042* (2013.01); *H01G 9/15* (2013.01); *H01G 11/24* (2013.01); *H01G 11/36* (2013.01); *H01M 4/583* (2013.01); *B82Y 30/00* (2013.01); *Y02E 60/13* (2013.01)

(58) Field of Classification Search
CPC ..... Y02E 60/122; Y02E 60/13; H01M 4/625; B82Y 30/00; H01G 11/36; H01G 9/0036

USPC ........................................................ 429/231.8
See application file for complete search history.

(56) References Cited

U.S. PATENT DOCUMENTS

| | | | | |
|---|---|---|---|---|
| 2009/0246625 | A1* | 10/2009 | Lu .............................. | 429/207 |
| 2010/0261058 | A1* | 10/2010 | Lopatin et al. ................ | 429/212 |
| 2012/0028123 | A1* | 2/2012 | Asari et al. ................. | 429/231.8 |
| 2012/0313591 | A1* | 12/2012 | Brambilla et al. ............ | 320/166 |
| 2013/0130077 | A1* | 5/2013 | El-Ashry et al. ................ | 429/66 |

(Continued)

OTHER PUBLICATIONS

Kotz and Carlen, Principles and applications of electrochemical capacitors. Electrochimica Acta, 2000, (45), 2483-2498; Simon and Gogotsi: Materials for electrochemical capacitors. Nat. Mater., 2008, (7), 845-854.

(Continued)

*Primary Examiner* — Stewart Fraser (57) ABSTRACT

An enhanced energy storage device such as double layer capacitor or battery is made starting with a substrate capable of conducting stored energy. The substrate material is one in which ordered pores can be formed, creating a template of densely arrayed pores. An electrode comprised of high density carbon nanotubes within the template is grown from and oriented substantially perpendicular to the substrate to constitute an axi-symmetric, ultra-high surface area electrode, and then the template is then selectively and only partially etched. An electrolyte is structurally confined anisotropically around the nanotubes by a remaining portion of the selectively and partially etched template so that substantially enhanced energy storage is obtained. The optimal structural confinement, which causes optimal charge storage, depends upon the amount of partial etching of the template which is defined by the electrolyte selected.

10 Claims, 9 Drawing Sheets

(56) References Cited

U.S. PATENT DOCUMENTS

2013/0222975 A1* 8/2013 Yan et al. .................. 361/502
2014/0093773 A1* 4/2014 Hashimoto et al. ........... 429/211

OTHER PUBLICATIONS

Simon and Gogosi; Materials for electrochemical capacitors. Nat. Mater., 2008 (7), 845-854; Conway; Electrochemical Supercapacitors; Scientific Fundamentals and Technological Applications, 1999.

Huang, Sumpter and Meunier; A Universal Model for Nanoporous Carbon Supercapacitors Applicable to Diverse Pore Regimes, Carbon Materials, and Electrolytes. Eur. Chem. J., 2008, (14), 6514-6626.

Ervin; Carbon Nanotube and Graphene-Based Supercapacitors: Rationale, Status, and Prospects. 2010, ARL-TR-5283.

Peigney, Laurent, Flahaut, Basca and Rousset: Specific surface area of carbon nanotubes and bundles of carbon nanotubes. Carbon, 2001,(39). 507-514.

Stoller, Park, Zhu, An and Ruoff; Graphene-Based Ultracapacitors. Nano Letters, 2008, (8), 3498-3502.

Parkhutik and Shershulsky; Theoretical Modeling of Porous Oxide-Growth on Aluminum. J. Phys. D, 1992, (25), 1258-1263.

Ahn, Sohn, Kim, Shim, Kim and Seong: Electrochemical capacitors fabricated with carbon nanotubes grown within the pores of anodized aluminum oxide templates. Electrochem. Comm., 2006, (8), 513-516.

Hill, Haller and Ziegler; Direct Fabrication of High-Aspect Ratio Anodic Aluminum Oxide with Continuous Pores on Conductive Glass. J. Electrochem. Soc., 2010, (158), E1-E7.

* cited by examiner

Unconfined Electrolyte
Fig. 6 (a)

Confined Electrolyte
Fig. 6 (b)

Fig. 7 (a)

*0.4μm deep NOT etched*

Fig. 7 (b)

*0.4μm deep 30 min etch*

ENHANCED CHARGE-STORAGE ELECTROCHEMICAL DOUBLE LAYER CAPACITORS WITH NANOSCALE ELECTROLYTE CONFINEMENT TUNABILITY, AND A METHOD FOR PRODUCTION THEREOF TO OBTAIN AXI-SYMMETRIC, HIGH SURFACE AREA ELECTRODE GROWTH

BACKGROUND AND SUMMARY OF THE INVENTION

The present invention relates to capacitors having increased charge storage and a method for their production. More specifically, the present invention relates to electrochemical double layer capacitors in which axi-symmetric, high surface area electrode growth is produced and nanoscale electrolyte confinement tenability allows for electrolyte generality and enhanced capacitance.

Electrochemical-based capacitive energy storage is based on charge adsorbed within the electric double layer to store electrical energy. [Kotz and Carlen; *Principles and applications of electrochemical capacitors.* Electrochimica Acta, 2000, (45), 2483-2498; Simon and Gogotsi; *Materials for electrochemical capacitors.* Nat. Mater., 2008, (7), 845-854] Due to the high specific surface area of nanomaterials and the mechanism of electrochemical double layer capacitor (EDLC) charge storage, many believe that EDLCs can bridge the gap between batteries and capacitors with respect to power and energy density [Simon and Gogotsi; *Materials for electrochemical capacitors.* Nat. Mater., 2008, (7), 845-854; Conway; *Electrochemical Supercapacitors: Scientific Fundamentals and Technological Applications.* 1999,]. DLC electrode materials, which primarily determine the extent of charge storage and partially determine the rate of charge transport/transfer, are commonly metal oxide- or carbon-based. [Kotz and Carlen; *Principles and applications of electrochemical capacitors.* Electrochimica Acta. 2000, (45), 2483-2498; Jayalakshmi and Balasubramanian; *Simple Capacitors to Supercapacitors—An Overview.* Int. J. Electrochem. Soc., 2008, (3), 1196-1217]. Most commercial EDLCs use activated carbon electrodes and it is well understood that the pore size in the activated carbon (AC) highly influences specific capacitance. [Huang, Sumpter and Meunier; *A Universal Model for Nanoporous Carbon Supercapacitors Applicable to Diverse Pore Regimes, Carbon Materials, and Electrolytes.* Eur. Chem. J., 2008, (14), 6614-6626]. The surface area of AC can be high (2600 m$^2$/g), but much of this surface area is inaccessible to the electrolyte and the pore size is distributed over a large range. Therefore, the charge/discharge rate is mass transfer limited which leads to low specific energy densities and the pore size distribution does not optimize charge adsorption for a given electrolyte. [Ervin; *Carbon Nanotube and Graphene-Based Supercapacitors: Rationale, Status, and Prospects.* 2010, (ARL-TR-5283)].

Many other forms of carbon including fibers, various nanostructures, and graphene have also been used as a component of EDLC electrodes. Single- and multi-walled carbon nanotubes (SW- and MW-NTs) are of particular interest due to their material properties, radial symmetry and high surface area. SWNTs offer the second highest electrolyte accessible surface area of all carbon matrices (graphene is highest), but are more desirable than graphene as they can be controllably oriented; lending to faster electrolyte percolation and facile electrochemical kinetics. [Ervin; *Carbon Nanotube and Graphene-Based Supercapacitors: Rationale, Status, and Prospects.* 2010, (ARL-TR-5283; Peigney, Laurent, Flahaut, Bacsa and Rousset; *Specific surface area of carbon nanotubes and bundles of carbon nanotubes.* Carbon, 2001,(39), 507-514; Stoller, Park, Zhu, An and Ruoff; *Graphene-Based Ultracapacitors.* Nano Letters, 2008, (8), 3498-3502.] However, current fabrication methods fail to produce 100% metallic SWNTs. Two thirds of the SWNTs produced are semiconducting, thus they are not ideal for use as an electrode. Bulk CVD production of MWNTs yields high-strength and -thermal conductivity structures that are nearly 100% electrically conducting. The CVD method also produces MWNTs that can be oriented in arrays, thus maximizing kinetics and electrolyte percolation. In the limit of low diameter (<10 nm), MWNTs are better suited as EDLC electrode materials because their number density approaches that of SWNTs and roughly 67% more of the array is electrically conducting.

An object of our invention is to provide a method to precisely tune the degree of electrolyte confinement (pore size) around an ultra-high surface area electrode. Yet another object of our invention is to produce an electrode-electrolyte system exhibiting enhanced charge storage with applications in electrochemical energy storage systems, such as electrochemical double layer capacitors, solid state capacitors, and batteries. We have achieved this with a recognition of the surprising advantages achievable through a combination of templated fabrication of high density aligned MWNTs and confinement of the electrolyte around each electrode, enhancing charge storage in the system.

In a currently contemplated embodiment of our invention, anodized aluminum oxide (AAO) is used to template the growth of high density arrays of MWNTs, as well as to enhance charge adsorption beyond that which is expected due to adsorbed charge within the Helmholtz planes of the double layer. As is known, AAO makes an ideal template for the fabrication of nanotubes with controlled orientation and dimensions due to the scalable and reproducible electrochemical self-assembly of ordered pores within aluminum during oxidation. [Parkhutik and Shershulsky; *Theoretical Modeling of Porous Oxide-Growth on Aluminum.* J. Phys. D. 1992, (25), 1258-1263;: Ahn, Sohn, Kim, Shim, Kim and Seong; *Electrochemical capacitors fabricated with carbon nanotubes grown within the pores of anodized aluminum oxide templates.* Electrochem. Comm., 2006, (8), 513-516; Hill, Haller and Ziegler; *Direct Fabrication of High-Aspect Ratio Anodic Aluminum Oxide with Continuous Pores on Conductive Glass.* J. Electrochem. Soc., 2010, (158), E1-E7] The additional charge storage from the diffuse domain of the double layer arises from anisotropic and tunable confinement of the electrolyte region around each MWNT by selectively and partially etching the AAO template. Templated-growth of the MWNTs allows for structures with diameters below 10 nm, lengths exceeding 1 cm, and MWNT array densities exceeding $10^{11}$ cm$^{-2}$ to be achieved. Furthermore, Raman spectroscopy indicates that high quality MWNTs are obtained from the templated CVD fabrication, and template-selective etching does not affect the MWNT structure. As high as an 8-fold increase in capacitance is observed when the template is partially etched compared to a completely etched MWNT array in an acetonitrile solvent system containing tetraethylammonium tetraflouroborate. This capacitance enhancement is expected with different electrolytes at different partial etching times (i.e. different electrolyte confinement size as defined by the MWNT surface to AAO pore wall distance). A specific capacitance in excess of 315 F/g-carbon is demonstrated using 10 nm diameter, 10 μm long MWNTs that are arrayed at a density of $4.5 \times 10^{11}$ cm$^{-2}$.

BRIEF DESCRIPTION OF THE DRAWINGS

These and further objects, features and advantages of the present invention will become more apparent from the following description, in addition to the above, when taken in conjunction with the accompanying, drawings wherein.

DETAILED DESCRIPTION OF THE DRAWINGS

Figure 1:
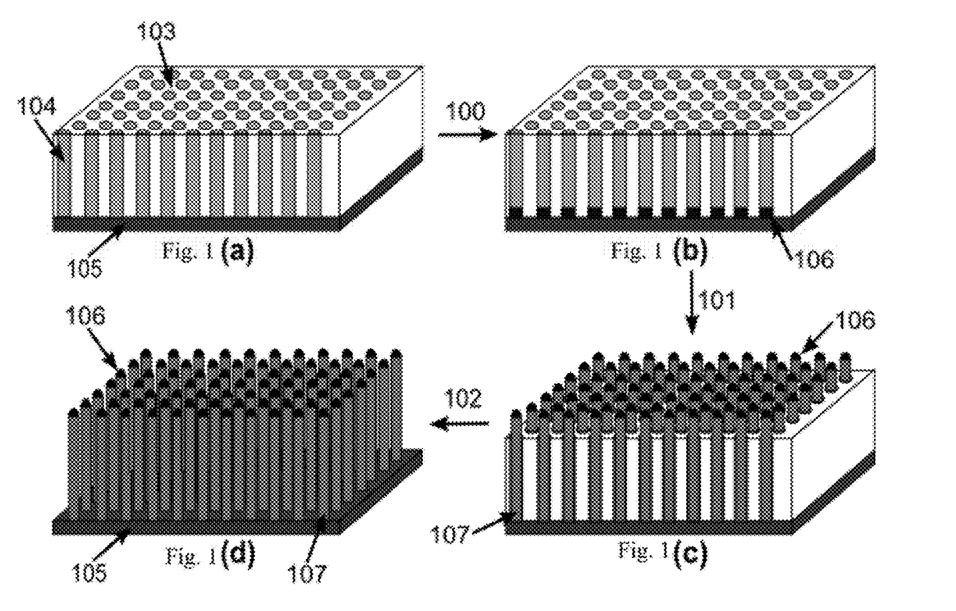
FIGS. 1(a)-1(d) are schematic views of a fabrication method for the preparation of arrayed high density MWNTs first through (a) porous template fabrication, then through (b) catalytic material electrochemical deposition at pore bottoms, then through (c) CVD CNT growth within the template, and finally through (d) full or partial removal of the template.

FIGS. 1(a)-(d) are schematic depictions of the fabrication method of the MWNT electrode with high density arrayed CNTs. First, a highly ordered anodic aluminum oxide (AAO) porous template (103) is fabricated through electrochemical oxidation at low temperatures directly on an aluminum substrate (105) as seen in FIG. 1(a). The AAO templates consist of an alumina matrix (103) containing self-ordered hexagonally close-packed pores (104) with an adjustable pore diameter and length that acts as a nanostructured template for CNT growth. Second, as seen in FIG. 1(b), metallic catalyst nanoparticles (106) are electrochemically deposited (100) at the pore base. Third, as seen in FIG. 1(c), CNTs (107) are grown in the templates through chemical vapor deposition (CVD) (101). Finally, as seen in FIG. 1(d), the template is removed completely or partially through chemical etching to expose the MWNT array (102), resulting in a high density MWNT array (107) aligned perpendicular to the remaining aluminum substrate (105) which acts as an electrical contact. Although the fabrication method has been described in connection with the use of an aluminum substrate, our invention also contemplates the use of zinc, tin, antimony, titanium, magnesium, niobium, tantalum or any material in which ordered pores can be formed into a template on a conductive substrate.

The template not only directs the growth, size and orientation of the CNTs, it also facilitates a tunable gap between the dielectric alumina nanopore and CNT wall. This gap confines the electrolyte and enhances charge storage. Furthermore, the confinement region is uniform and axisymmetric, thereby optimizing charge transport during capacitive charge/discharge cycles. The nanowire material need not be a MWNT, it can be any conducting material which can be grown by electrodeposition, chemical vapor deposition or other methods without departing from the spirit of the present invention.

Figure 2:
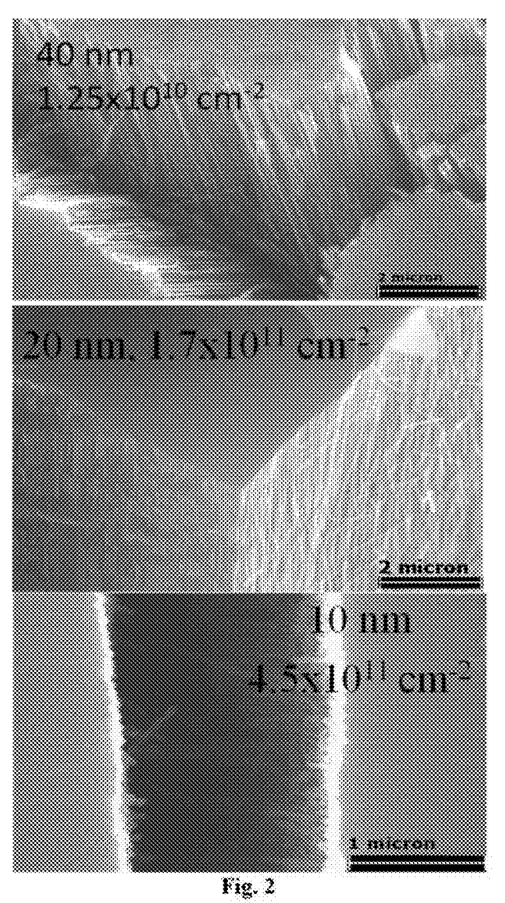
FIG. 2 consists of SEM micrographs of high density aligned MWNT electrodes with, respectively from the top, 40, 20, and 10 nm pore diameters produced with AAO templates.

SEM micrographs of ultra-high density and low diameter MWNT arrays produced using the template approach as described above in reference to FIGS. 1(a)-(d) are shown in FIG. 2. The template allows for precise control over the diameter and length of the nanotubes. The MWNTs produced were terminated at the top of the pore, resulting in equivalent lengths and no interference between any of the nanotubes. For 10, 20, and 40 nm diameter MWNTs, the density of nanotubes was determined to be $4.5 \times 10^{11}$ cm$^{-2}$, $1.7 \times 10^{11}$ cm$^{-2}$, and $1.25 \times 10^{10}$ cm$^{-2}$, respectively. Anodizations of smaller diameter pores resulted in closer packing of the pores which allowed for the higher density nanotube arrays. When compared to arrays grown without templates, the nanotube density was surprisingly enhanced by a factor of 100 to 1000. Pore diameters and MWNTs in the range of 1-10 nm can be produced by pore wall coating the AAO nanopores with a material. Otherwise, nearly any diameter can be achieved from 10-100's nm by tuning the anodization conditions. Therefore, significantly more active electrode material is available in electrodes produced by the template method in accordance with the present invention.

Raman spectroscopy is a characterization technique that determines if the carbonaceous sample is composed of crystalline or amorphous carbon and provides information about the presence of single-walled nanotubes (SWNTs) and MWNTs in a sample. CNTs have a highly characteristic Raman shift spectra with three peaks: the disordered band (D) which indicates the presence of non-graphitic carbon, the graphitic (G) peak which is produced by graphite-like molecular structures, and the radial breathing mode, which indicates the presence of SWNTs. The ratio of the intensity of the D-band to G-band is a metric for the quality of CNTs and number of defects in the sample. Generally speaking, high quality SWNTs have a D/G ratio less than 0.1 and high quality MWNTs typically have a D/G ratio equal to or just less than unity. MWNT tubes generally have more disorder (as indicated by a higher D-band peak intensity) due to defects within the graphitic structure but also this can show up as an artifact in Raman spectroscopy from tube-tube interaction.

Figure 3:
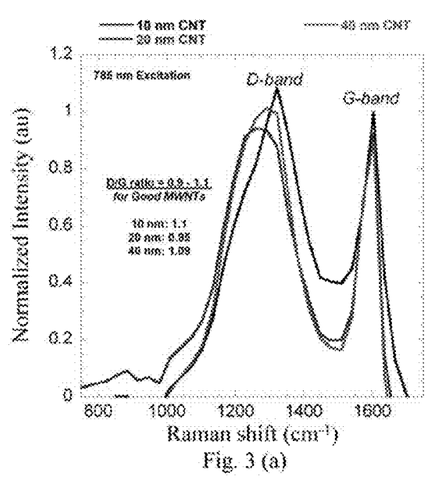
FIG. 3(a) is a Raman spectra for 10, 20, and 40 nm MWNTs normalized to compare the D-band and G-band peaks, the ratio indicating that high quality MWNTs were produced.
FIG. 3(b) is a Raman spectra at sequential times during template removal, indicating that the MWNTs remain unchanged.

More specifically, high quality MWNTs typically have a D/G ratio between 0.95 to 1.1 and do not exhibit a peak for the radial breathing mode. MWNTs produced using the template approach were high quality tubes with a D/G ratio of 1.1, 0.95, and 1.09 for 10, 20, and 40 nm nanotube diameters, respectively. The Raman spectra for these electrodes, as shown in FIG. 3(a) (left-hand graph), have a normalized intensity. Enhanced capacitance of the electrodes was observed with partial chemical etching of the template. To ensure that the CNTs remained unaltered chemically throughout the etching of the template, the Raman spectra for the CNTs at sequential etching times were taken and are also shown in FIG. 3(b) (right-hand graph). Neither the positions nor the intensity of the D- and G-peaks changed during the etching process. There are therefore no chemical or structural changes to the MWNT array during etching, but only removal of the AAO. Thus, the observed capacitance is seen to be a result of the electrode geometry and electrolyte confinement, and not due to any changes in the material itself.

Figure 4:
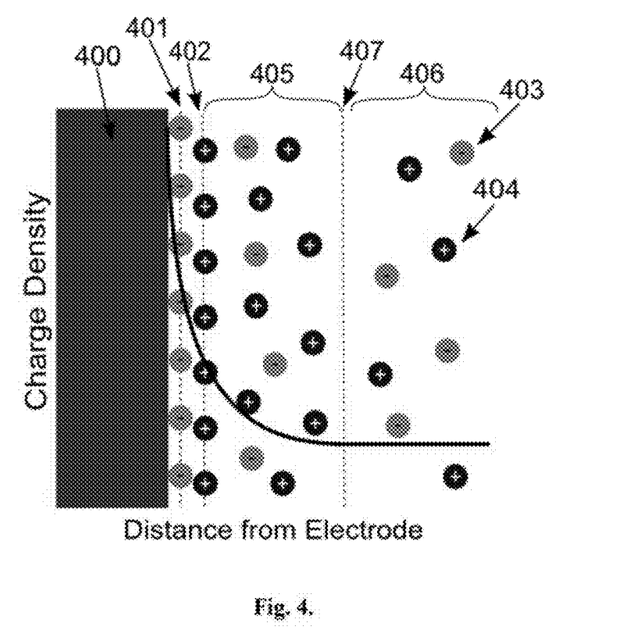
FIG. 4 is a schematic showing the structure of the electrochemical double layer in a typical electrode setup with an unconfined electrolyte.

In an electrochemical double layer capacitor as previously noted, charge is stored in the electrochemical double layer (EDL) at the electrode surface. The EDL schematically shown in FIG. 4 consists of four main regions in the electrolyte. The majority of charge is stored in the inner Helmholtz plane (401) and outer Helmholtz plane (402), which consists of partially desolvated ions (403 and 404) at the electrode (400) surface. In the diffuse region (405), the concentration of charge carriers decreases until it reaches equilibrium with the bulk electrolyte (406). The Debye-Huckel length (407) is the distance from the electrode over which there is a significant change in the concentration of charge carriers. The transition from the diffusion layer to the bulk electrolyte region (407) is equivalent to 10 to 20 Debye lengths.

Figure 5:
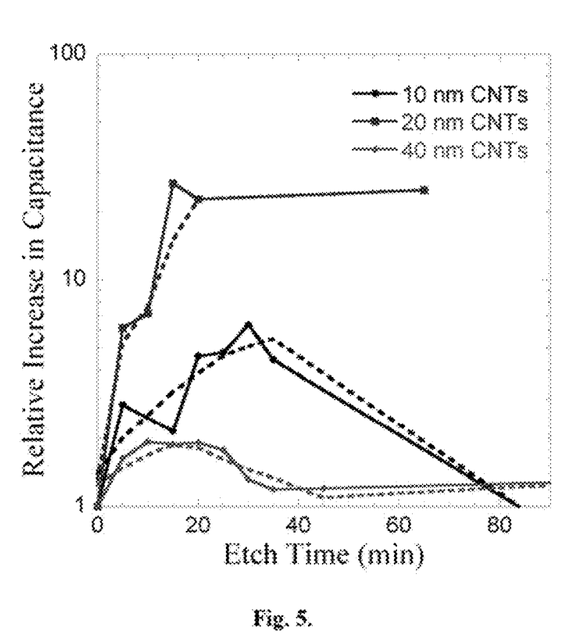
FIG. 5 is a graph showing enhancement of the double layer capacitance of a MWNT array during template etching post-CNT growth.

After nanotube growth, the MWNTs initially occupy the entire nanopore in which they were grown. Around each MWNT is an alumina pore which is selectively etched to enhance capacitance. The degree of etching can be tuned to match the pore diameter with the solvated electrolyte size such that capacitance is maximized for each electrolyte/solvent composition. That is, the template can be selectively etched to widen the pores and increase the region that the electrolyte can occupy around the pore. The electrolyte used for the capacitance measurements was 1.5 M tetraethylammonium tetrafluoroborate (TEATFB) in acetonitrile. For MWNT/AAO arrays of 10, 20, and 40 nm MWNT diameters, capacitance measurements were taken over the course of etching the template. Capacitance characterization was done for each array, followed by five minutes of etching in dilute phosphoric and a one minute rinse in acetonitrile. This procedure was repeated until the template was completely removed. The results are seen in FIG. 5, where the inset of the right figure is the selective etching direction to widen the pore which optimizes the capacitance prior to fully etching the alumina template, at which point a freestanding array of MWNTs or other conducting nanowires is left behind. The average specific capacitance was scaled relative to the unetched sample to show the relative increase in capacitance. Capacitance values for each sample reach a maximum value prior to complete template removal. The 40 nm diameter MWNTs demonstrate a 2- to 3-fold increase in capacitance after 10-20 minutes of etching, corresponding to 14% etched. For the 10 nm diameter MWNTs, an 8-fold increase in the capacitance from the unetched sample is demonstrated after 30 minutes of etching; this corresponds to a 25% etched pore wall. Theoretically, the ideal amount of pore widening is 2.5-2.8 nm, which is equivalent to approximately one Debye-Huckel length of the electrolyte. The Debye-Huckel length characterizes the distance over which there is a significant difference in the concentration of charge carriers from the bulk electrolyte. Both the 10 nm and 40 nm samples supported this hypothesis as both capacitance characterizations were optimal after 2.5-2.8 nm. This indicates that at this pore diameter, the electrolyte is confined within the Debye-Huckel length, resulting in enhanced capacitance of the electrode.

Figure 6:
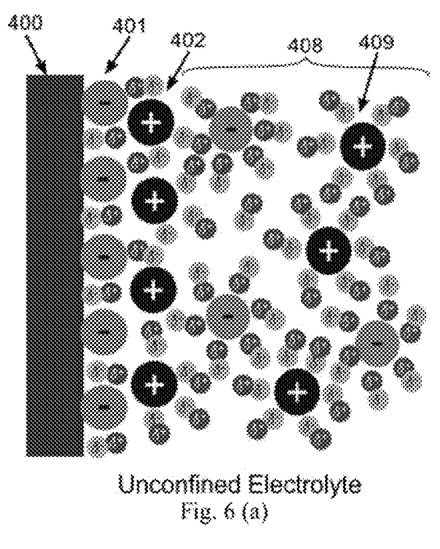
FIGS. 6(a) and 6(b) are schematic views showing the comparison of charge storage in the electrolyte for an unconfined (on the left) and confined (on the right) electrochemical double layer.
Figure 7:
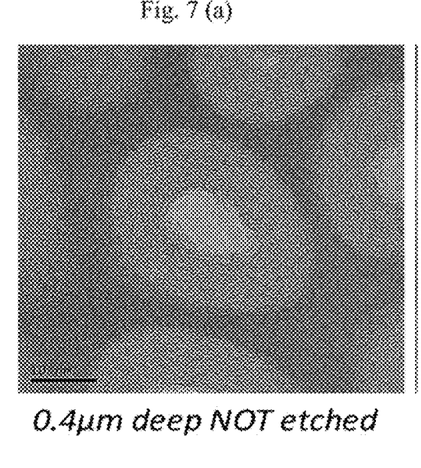
FIGS. 7(a) and 7(b) are TEM images of MWNTs in an AAO template (left image) prior to etching and (right image) after 30 minutes of etching to remove template around the MWNT.
FIG. 7(c) is a graph showing the average pore diameter at increasing template depths and indicating that the template is selectively removed closer to the surface.

By confining the electrolyte with the remaining alumina template, the structure of the electrolyte beyond the inner Helmholtz plane (401) and the outer Helmholtz plane (402) is affected as seen schematically in FIGS. 6(a) and (b) which compare the structure of the electrolyte and electrochemical double layer with and without electrolyte confinement. In both systems, the inner Helmholtz plane (401) and outer Helmholtz plane (402) remain the same, consisting of desolvated positive and negative ions. For an electrode with an unconfined electrolyte (FIG. 6(a)), an electrically neutral diffusion region (408) contains fully solvated ions (409) that do not contribute to the charge storage of the system. For the confined electrolyte (FIG. 6(b)), however, the solvation shells around the electrolyte ions are disrupted and interact electrically with the electrode (400), and can therefore be partially adsorbed by the electrode to contribute to charge storage. This results in a diffuse region that is not electrically neutral and results in enhanced or increased capacitance. The enhanced capacitance was observed when the electrolyte region is confined by the remaining interpore alumina wall (411). To visually confirm the size of the confinement region, a combination of focused ion beam (FIB) milling and TEM imaging were used. FIB milling was used to obtain a thin layer of electrode material at various depths for etched and unetched MWNTs that could be imaged with a TEM. The TEM micrographs in FIGS. 7(a) and (b) are of MWNTs in the template prior to etching (FIG. 7(a)) and after 30 minutes of etching at a depth of 0.4 μm (FIG. 7(b)). After 30 minutes of etching, the average pore diameter decreased with increasing depth within the template, while it remained constant when unetched. This indicates that the template is selectively removed at the surface of the template, creating a region within which the electrolyte is confined. The swelling of the MWNT is an artifact of the sample preparation process by which a focus ion beam (gallium) is used to mill the sample to electron transparency. Though the MWNTs should not fully coat the widened pores, they do in the images shown due to Ga ion implantation and swelling of the MWNT structure.

Figure 8:
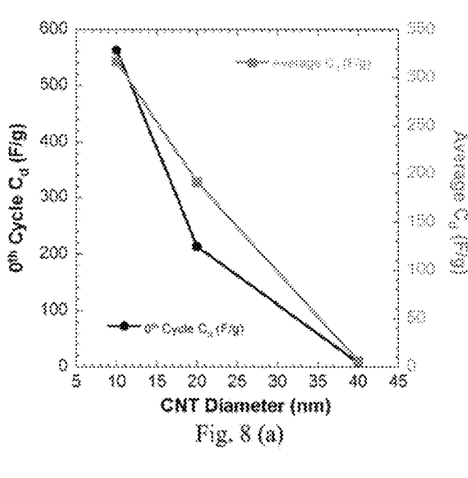
FIGS. 8(a) and 8(b) consist of two graphs whereby the $0^{th}$ cycle and average specific capacitance (F/g) of a currently contemplated embodiment of the electrode according to our invention as a function of MWNT diameter (left) and carbon mass (right) for arrays of 10, 20, and 40 nm diameter MWNT arrays.

At the optimal etch times, the $0^{th}$ cycle specific capacitance of the 10 nm diameter MWNT array is three times higher than the 20 nm sample and more than 10 times higher than the 40 nm sample as shown in FIG. 8(a). This is due to the increased surface area with smaller diameter pores, allowing for more active charge storage area. That is, the higher capacitance for the lower diameter is a result of high density MWNTs. The lower diameter MWNTs also have less walls than the larger diameter MWNTs, and this leads to a more effective use of carbon mass per unit charge, as is indicated in the maximum capacitance and minimum mass. The area of the 10 nm sample is three to five times higher than the 20 nm sample and more than 10 times higher than the 40 nm sample. The specific capacitance as a function of carbon mass (obtained by TGA) are shown in FIG. 8(b). The lowest carbon mass corresponds to the highest capacitance, which is the 10 nm diameter electrode.

Figure 9:
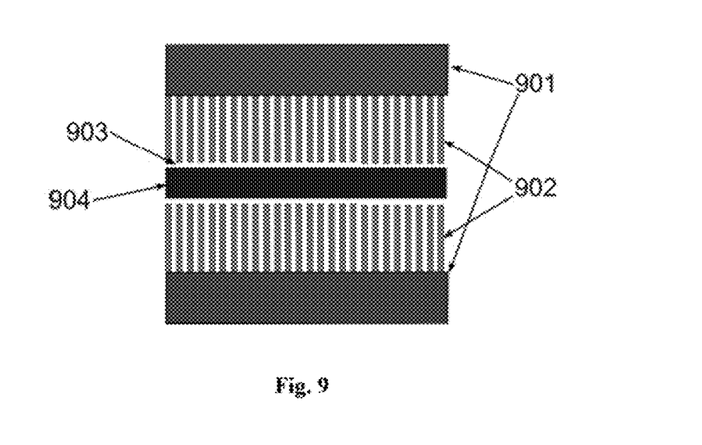
FIG. 9 is a schematic drawing of one embodiment of the electrode according to the present invention incorporated into a generic energy storage device.

The above-described electrode, consisting on a high-density MWNT array and alumina matrix with an ideal electrolyte confinement region, can be incorporated into many energy storage and conversion devices, e.g. ultracapacitors, batteries, or solid-state capacitors. A general schematic of the electrode material incorporated into a device is outlined in FIG. 9. The electrode material, consisting of the high-density CNT and partially-etched alumina array (902), is in direct contact with the current collector (substrate) (901), serving as a half cell of the device. The electrolyte (903) is confined within the matrix of the electrode material and can have a different composition depending on the embodiment of the design. In one embodiment as an EDLC, the electrolyte, e.g. tetraethylammonium tetrafluoroborate, stores charge in the EDLC, and in another embodiment, as say a battery, the electrolyte, e.g. a lithium salt in an organic solvent, stores change via a chemical reaction at the surface. The exact electrolyte composition and confinement region can be optimized depending on the end application of the electrode and devices. The two identical half cells are separated by a membrane or spacer (904) For an EDLC device, an ion-exchange membrane would separate the cells; for a battery, a separator; and for a solid state capacitor, a dielectric layer in a manner known to those skilled in the art.

While we have shown and described a currently preferred embodiment of the present invention, it must be understood that the same is susceptible to changes and modifications that still fall within the scope of the invention. Therefore, the present invention is not to be limited to the details shown and described herein but shall include all such changes and modifications falling within the scope of the appended claims.

We claim:

1. A capacitive device, comprising a substrate capable of conducting energy stored in the device and selected from a material in which ordered pores are formable on the substrate, a template comprised of high density carbon nanotube arrays grown from and oriented substantially perpendicular to the substrate to constitute an ultra-high surface electrode, which template is then selectively and only partially chemically etched, and an electrolyte structurally confined anisotropically around each of the nanotubes by a remaining portion of the selectively and partially etched template, the amount of partial etching of the template and the electrolyte being selected to produce substantially enhanced charge electro-absorption of charge on the electrode.

2. The device according to claim 1, wherein the arrays are comprised of multi-walled carbon nanotubes.

3. The device according to claim 1, wherein the device is configured as one of a double layer capacitor and a solid state capacitor.

4. The device according to claim 1, wherein the electrolyte is confined in a predetermined region around the nanotubes in the device by the selective and partial etching of the template.

5. The device according to claim 1, wherein the substrate is selected from one of aluminum, zinc, tin, antimony, titanium, magnesium, niobium, and tantalum.

6. The device according to claim 4, wherein the template is formed directly on the substrate as anodized metal oxide as a result of electrochemical oxidation so as to obtain controlled orientation and dimensions of pores during oxidation of the substrate.

7. The device according to claim 6, wherein the substrate is aluminum and the template is formed thereon as anodized aluminum oxide with the anodization carried out at low temperature.

8. The device according to claim 6, wherein the anodized metal oxide is comprised of a metal oxide matrix of self-ordered hexagonal close-packed pores with selectively adjustable pore diameter and length for nanotube growth by chemical vapor deposition.

9. The device according to claim 8, wherein catalyst nanoparticles are deposited electrochemically at a base of the pores prior to chemical vapor deposition.

10. The device according to claim 1, wherein the nanotubes have pore diameters 1 nm-1 micron, lengths 100 nm to 1 cm and array densities of up to $10^{12}$ cm$^2$.

* * * * *